United States Patent
Bruck et al.

(10) Patent No.: US 6,779,558 B1
(45) Date of Patent: Aug. 24, 2004

(54) VALVE, ESPECIALLY A PRESSURE CONTROL VALVE

(75) Inventors: Peter Bruck, Zweibrücken (DE); Thorsten Hillesheim, Saarbrücken (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 66 days.

(21) Appl. No.: 10/129,335

(22) PCT Filed: Nov. 3, 2000

(86) PCT No.: PCT/EP00/10844
§ 371 (c)(1),
(2), (4) Date: May 3, 2002

(87) PCT Pub. No.: WO01/33307
PCT Pub. Date: May 10, 2001

(30) Foreign Application Priority Data

Nov. 5, 1999 (DE) .......................... 199 53 209

(51) Int. Cl.[7] .............................................. F15B 13/044
(52) U.S. Cl. .................................... 137/625.65; 91/433
(58) Field of Search ...................... 137/625.65; 91/433; 138/40

(56) References Cited

U.S. PATENT DOCUMENTS

| 4,250,922 | A | * | 2/1981 | Will et al. ............. 137/625.65 |
| 4,316,599 | A |   | 2/1982 | Bouvet et al. |
| 4,635,683 | A | * | 1/1987 | Nielsen .................. 137/625.65 |
| 4,669,504 | A | * | 6/1987 | Fujitsugu et al. ...... 137/625.65 |
| 4,899,785 | A | * | 2/1990 | Inokuchi ................ 137/625.65 |
| 4,947,893 | A | * | 8/1990 | Miller et al. ........... 137/625.65 |
| 4,960,260 | A | * | 10/1990 | McEnearney ................ 138/42 |
| 5,075,584 | A | * | 12/1991 | Hendrixon et al. .... 137/625.65 |
| 5,174,338 | A |   | 12/1992 | Yokota et al. |
| 5,853,028 | A | * | 12/1998 | Ness et al. ............. 137/625.65 |
| 5,894,860 | A |   | 4/1999 | Baldauf et al. |
| 6,269,827 | B1 | * | 8/2001 | Potter ..................... 137/625.65 |
| 2002/0007857 | A1 | * | 1/2002 | Lou ...................... 137/625.65 |

FOREIGN PATENT DOCUMENTS

DE 3144362 5/1983
DE 4115594 11/1992

* cited by examiner

Primary Examiner—Gerald A. Michalsky
(74) Attorney, Agent, or Firm—Roylance, Abrams, Berdo & Goodman, LLP

(57) ABSTRACT

A valve, especially a pressure control valve, includes a housing (10) with a pump connection (P), an appliance connection (A) and a tank connection (T). A piston (16) controlled by a magnet armature (26) is guided inside the housing (10) of the valve. The vavle is provided with a hydraulic damping device (34) having a damping chamber (36) in fluid communication with appliance connection (A) through a throttle (38). The pump connection (P) or the tank connection (T) is selectively joined to the appliance connection (A) via a connecting line (40) according to the position of the piston (16). This valve improves upon known control valves so that the control valve remains stable in terms of behavior, especially with regard to permanent oscilliations.

7 Claims, 3 Drawing Sheets

VALVE, ESPECIALLY A PRESSURE CONTROL VALVE

FIELD OF THE INVENTION

The present invention relates to a valve, a pressure control valve in particular, with a valve housing having pump, appliance and tank connections. A valve piston can be driven by a magnetic inductor for guided movement within the valve housing.

BACKGROUND OF THE INVENTION

Conventional proportional pressure control valves are used, among other things, as control valves for oil-hydraulic systems to deliver a more or less constant output pressure with variable input pressure. The output pressure to be controlled is assigned by the current signal delivered by suitable triggering electronics and acting on an actuating magnet. The actuating magnet may be designed as a pressure sealed oil bath magnet with a long service life.

Proportional pressure control valves serving this purpose may be directly controlled piston valves of a three-way design, that is, with pressure protection on the output side. They are employed, among other things, in oil-hydraulic systems to control couplings, in shift transmissions for exerting a specific pressure buildup and pressure reduction effect, for remote pressure adjustment, for control of pressure variation over time and for pilot control of hydraulic valves and logic elements.

Conventional proportional pressure control valves employed for these purposes are characterized by poor stability, especially in the case of low-viscosity fluid media. They begin to vibrate, something especially harmful if the conventional valves are to perform special functions, for example, in motor vehicle power steering systems, areas relating to safety engineering, or the like. Generally, susceptibility to disturbances has been found to occur in the natural frequency range of the valve. The instabilities arising may result in functional failure of a valve and the relevant parts of its system.

SUMMARY OF THE INVENTION

Objects of the present invention are to provide improved valves with more stable behavior, in particular with respect to steady-state vibrations, so that the valve is also well suited for special appliances.

The valve according to the present invention is provided with a hydraulic damping device having a damping chamber connected by a throttle to the connection of the appliance to convey fluid. Optionally, the pump connection or tank connection communicates with the appliance connection. In the event of displacement of the valve piston toward the choke as a result of the magnetic force of a switching magnet, the fluid stored in the damping chamber is displaced toward the appliance connection by the throttle. The displacement volume flow generates local pressure buildup by the throttle. A force directed against the deflecting force of the valve piston onto the effective pressure surface adjoining the flow restriction point may be determined. Thus, a damping effect may be exerted on the entire valve piston. As the valve piston travels back in the opposite direction, this volume of fluid must flow back away from the appliance connection into the damping space, now increasing, again by of the throttle as defined. This flow also results in damping of the vibrations which occur.

In a preferred embodiment of the valve of the present invention, the throttle is in the form of a ring disk which impedes the flow of fluid between damping space and appliance connection by a flow restriction point. In one embodiment of the valve of the present invention, the flow restriction point may be in the form of a through opening inside the ring disk. Preferably, however, in an alternative embodiment, the flow restriction point is at least in part in the form of an annular passage formed between the ring disk and parts of the valve housing surrounding the ring disk. The latter solution improves damping results and can be applied cost effectively during manufacture.

In addition, the annular passage can discharge into a connecting duct of the ring disk communicating with to the damping space to conduct fluid. The ring disk can be flange-connected to the valve housing at various points, the annular passage being interrupted at the connection points, just as it is by frontal mounting of the annular passage in the interior of the valve housing. A simple yet functionally reliable connection of the throttle to the remaining portion of the valve housing is obtained in this manner.

In another especially preferred embodiment of the present invention, the connecting line extends at least in part parallel to the direction of advance of the valve piston inside the valve housing. This piston optionally makes connection with the tank or with the pump connection. As a result of the connecting line, the functional component proper of the valve is separated from the damping component, and, as a result, the functional reliability of the valve design is increased.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

For better understanding of the valve of the invention, a conventional proportional pressure control valve is described in detail with reference to FIG. 1.

Figure 1:
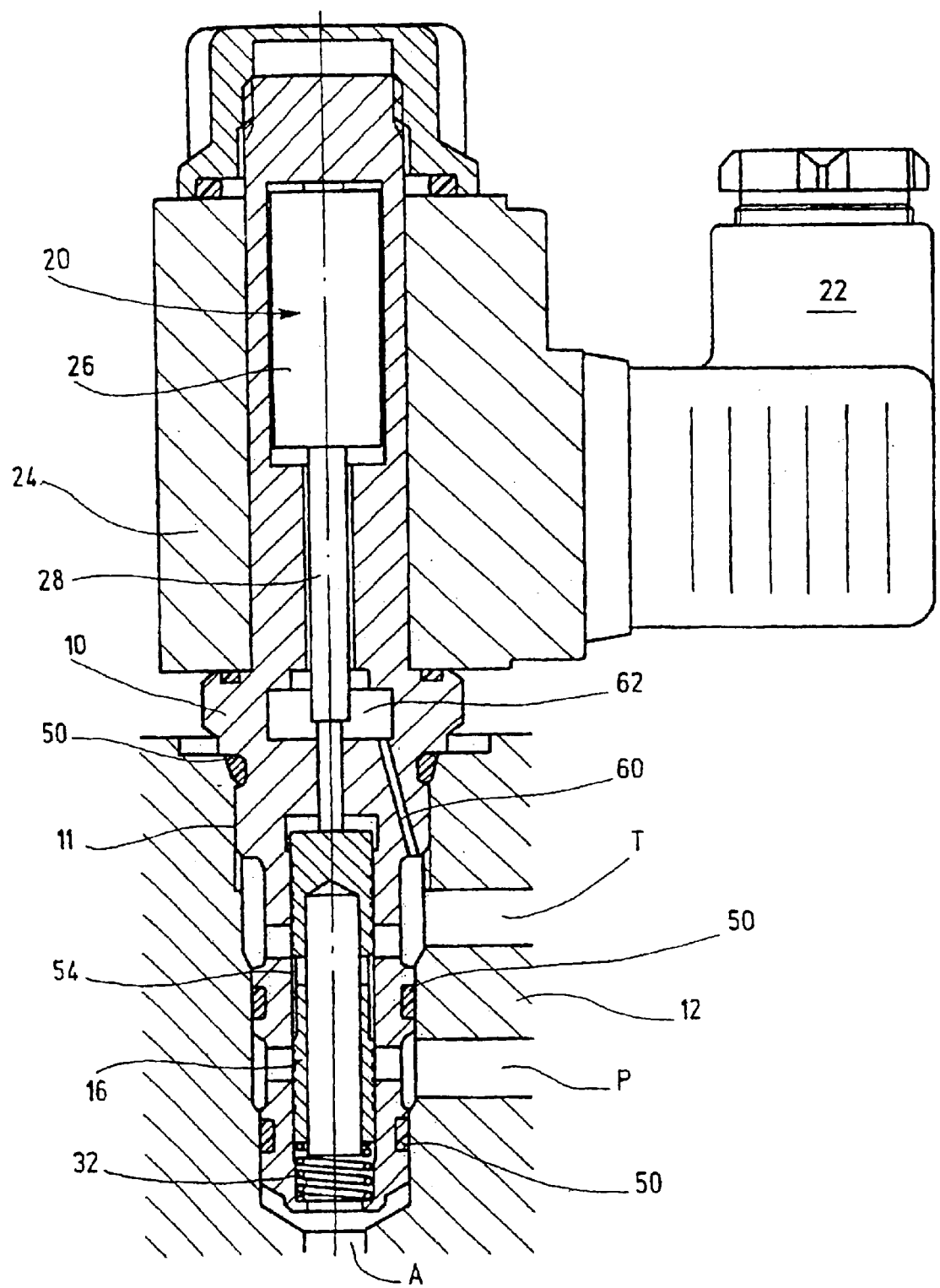
FIG. 1 is a top view, partly in section, of a conventional proportional pressure control valve.

The conventional valve shown in FIG. 1 includes a valve housing 10 in the form of a screw-insertion cartridge, also designated as a cartridge valve. The conventional valve is screwed or threaded into a valve receptacle 12 with its fluid connections P, T, and A, by way of external threading 11. A is the appliance connection. P is the pump connection. T is the tank connection. The main or valve piston 16 extends longitudinally inside the valve housing 10, and is suitably hardened and ground. A magnet system 20, for electric actuation of the piston, includes a circuit box 22 and a controllable magneto inductor 26 introduced into a magnetic coil 24. The magneto inductor 26 is connected to the valve piston 16 by a tappet-like actuating element 28. The front end of element 28 rests on a resetting or pressure spring 32, specifically, in the area of the appliance connection A. The other free end of the pressure spring 32 is in contact with a frontal inner recess in valve housing 10.

In the initial position, in which no current flows and the magneto inductor 26 has not been actuated, the valve is closed on the input side by the pump connection P. Also, on the output side, connection A communicates with the tank connection T to conduct fluid. For this purpose the valve piston 16 has on its external circumference, at a prescribed distance, an annular recess 54. If a current signal is now applied to the magnet system 20 by the circuit box 22, the magneto inductor 26 presses against the valve piston 16 with a force corresponding to the level of the control current. As a result, the control piston 16 is forced downward against the reset spring 32 and the fluid or oil flows from the pump connection P to the appliance connection A. If a consumer appliance device, such as a hydraulic cylinder or the like, is connected to the appliance connection A, a pressure builds up at the connection A which acts on the end surface of the control piston and generates a force opposite the magnetic force of the magnet system 20 to force the valve or control piston upward again. As a result, the inflow of the pump connection P to the appliance connection A is reduced until the pressure of the magnetic force applied to the appliance connection, and thus, the pressure value assigned by the current signal are again equal. If the consumer device requires no more pressurized fluid, for example, because the hydraulic cylinder has reached its throw limit, the valve piston 16 moves upward again and seals the pump connection P. If the output pressure drops, as a result of relief of pressure on the consumer device, below the prescribed pressure value, the magneto inductor 26 presses the valve piston 16 back downward and the control process may begin again. The maximum output pressure which may be reached, also designated as pressure stage, is established by the magnetic force.

One possible method of output pressure protection at the directly controlled piston valve from appliance connection A to tank connection T is executed as follows. If the pressure at the appliance connection A increases beyond the prescribed pressure, the valve piston is displaced upward with the magneto inductor 26 until the connection of appliance connection A to the tank connection T is opened. The pressure on the appliance connection A is consequently limited. In the event of interruption of the control current, the valve piston 16 is moved upward by the pressure on connection A and the reset spring 32. As a result, the appliance connection A is again connected to the tank connection T and the pressure on the appliance connection A drops to the tank pressure level.

The proportional pressure control valve used for this purpose is characterized by poor stability, in particular when low-viscosity media are employed. In theory, harmful vibrations of the valve around the area of the valve seat 14 are possible.

Figure 2:
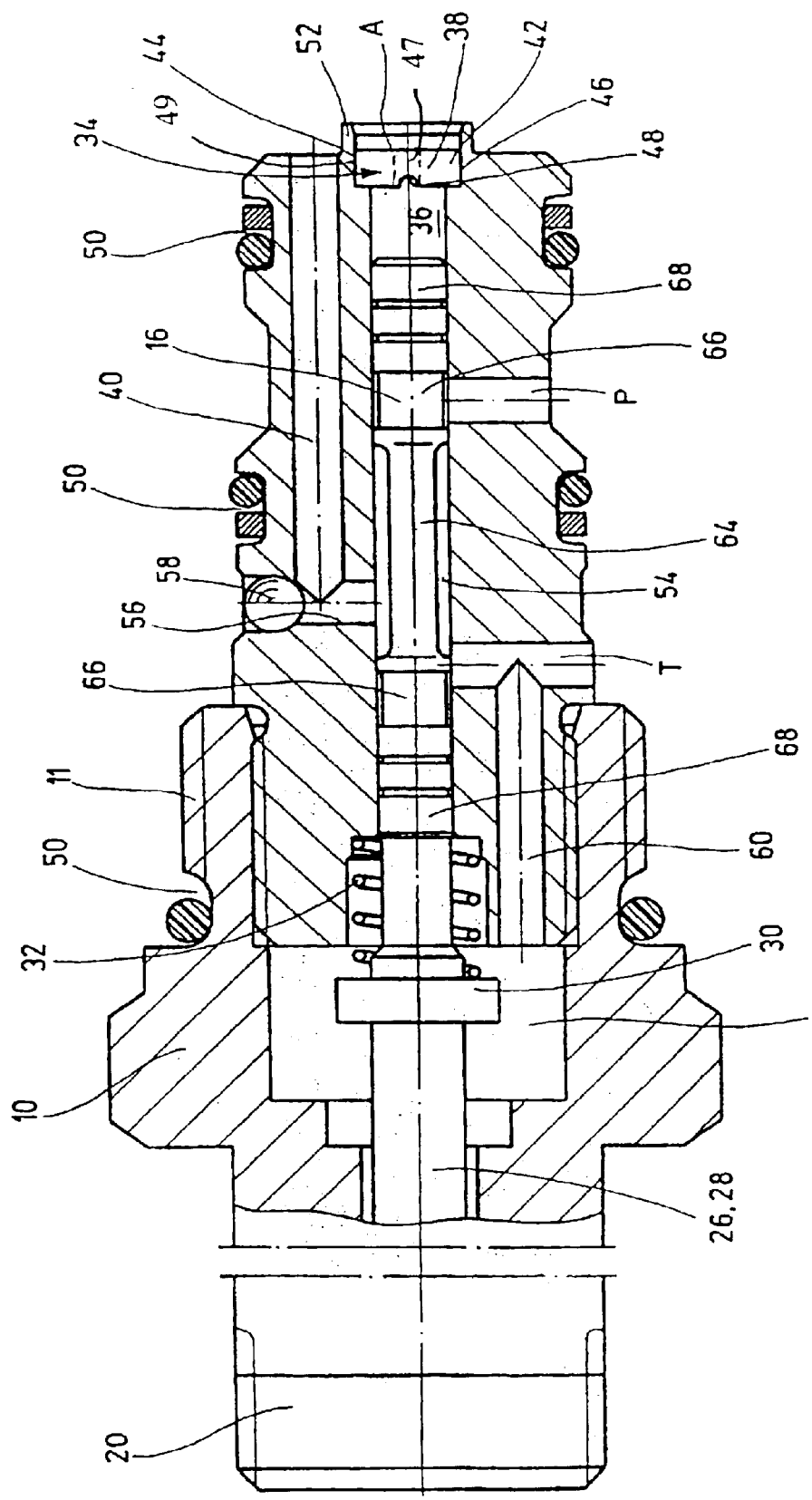
FIG. 2 is a top view, partly in section, of a valve according to the present invention.
Figure 4:
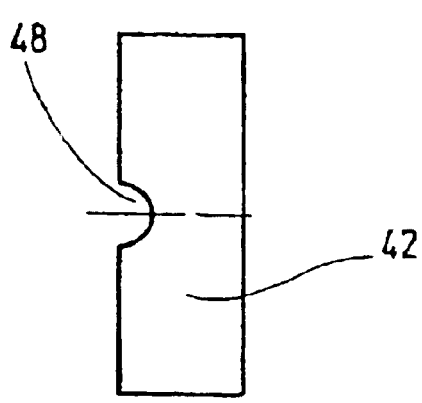
FIG. 4 is a side elevational view of the throttle of FIG. 3.
Figure 3:
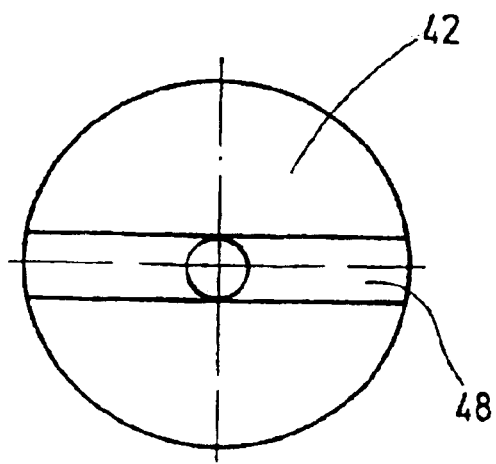
FIG. 3 is a front elevational view of the throttle of the valve of FIG. 2.

To counteract this harmful vibrational behavior, as is to be seen in FIGS. 2 to 4, the valve of the present invention has a hydraulic damping device 34. To the extent that the conventional valve elements described above are also used in the valve of the present invention, such valve elements are identified by the same reference number. The same description also applies to such valve elements in the disclosed embodiment of the present invention as well. Such elements are explained only to the extent that the embodiment of the present invention differs from that of the conventional valve previously described.

The damping device 34 is provided with a damping space 36 communicating with the appliance connection A by a throttle 38 so as to conduct fluid, and being filled with fluid. Optionally, the pump connection P or the tank connection tank connection T communicates with the appliance connection A through a connecting line 40, as a function of the position of the valve piston 16. In the switching position illustrated in FIG. 2, the pump connection P is separated from the appliance connection A. However, pump connection P communicates at least to some extent with the tank connection T by way of the valve piston 16.

The throttle 38 is in the form of a ring disk 42, as is shown in greater detail in FIGS. 3 and 4. The ring disk 42 impedes flow of fluid in both fluid directions between damping space 36 and appliance connection A by a throttle point 44. The throttle point 44 results from the ring disk 42 having a clearance of about 55 to 70 μm relative to the intake opening 46 in the valve housing 10. The ring disk 42 is otherwise sealed off from the appliance connection A. The throttle point could also be in the form of a through opening 47, preferably in the center of the of the ring disk 42. For production engineering reasons alone, manufacture of the mounting between ring disk 42 and intake opening 46 of the valve body 10 is simpler to accomplish and so more cost effective.

As seen especially from FIGS. 3 and 4, the ring disk 42 has on its inner side facing the damping space 36 a grooved connecting channel 48. The connecting channel 48 may be produced cost effectively, if, in manufacture of the ring disk 42, a through opening later forming the semicircular ring channel as connecting channel 48 is made before tapping of the turned component involved. The connecting channel 48 discharges outward on both sides of the ring disk 42. For the purpose of use of the valve illustrated in FIG. 2, recesses 50 are made in the external circumference on the valve housing 10, to be received in a suitable valve recess 12 (not shown). The recesses receive sealing means, especially sealing rings, to ensure sealing of the interior of the valve from the environment.

The ring disk 42 is hinge-connected or connected at various points 49 to the valve housing 10. The fluid-conducting annular gap is interrupted at the hinge connecting points 49, and by frontal mounting of the ring disk 42 on the interior of the valve housing 10 in the form of the intake opening 46. For the purpose of reliable hinge connection and dependable retention of the ring disk 42 inside the valve housing 10, hinge connecting points are provided at angles of 90°. At this point, the intake opening 46 narrows at various locations and the cylindrical valve receptacle 52, which faces the appliance connection or consumer connection A on the free end of the valve, is correspondingly narrowed at these locations. Up to the four points of application, however, flow of fluid between the appliance connection A and the damping space 36 is not impeded. Since the ring disk 42 rests frontally against the valve housing, subsequent flow of fluid into the damping space 36 takes place through the connecting channel 48, which both discharges into the damping space 36 and is connected so as to conduct fluid by way of its frontal surfaces to the throttling ring gap.

As is also to be seen from FIG. 2, the connecting line 40 is mounted to extend in part parallel to the direction of travel of the valve piston 16 inside the valve housing 10. The piston optionally communicates with the tank connection T or the pump connection P. The connecting line 40 extending parallel to the direction of displacement of the valve piston 16 inside the valve housing discharges at one of its free ends into the appliance connection A. At its other free end, line 40 discharges into a tie line 56 which discharges into the annular recess 54 in every displacement position of the valve piston 16. The tie line 56 is sealed off from the outside by a sealing ball 58. Like the pump connection P, the tank connection T is mounted transversely to the longitudinal direction of the valve piston 16. A pressure equalization line 60 discharges at one end into tank connection T. The other free end of pressure equalization line 60 discharges into a pressure space 62 penetrated by the actuating component 28 of the magneto inductor 26. In this area, magneto inductor 26 comes to rest against the valve piston 16.

The tank connection T and the pump connection P are separated from each other for fluid conduction or communication by a central valve piston component 64 having the annular recess 54. Depending on the state of the system, and thus depending on the displaced position of the valve piston 16 and of the central valve piston component 64, a fluid conducting connection or fluid communication is established between the appliance connection A and the tank connection T or between the appliance connection A and the pump connection P. Covering of the annular recess 54 with the pertinent connection P or T is effected for the fluid-conducting connection in question. Connections P and T otherwise discharge into a ringshaped narrowing 66 inside the valve piston 16. These connections are separated by the central valve piston component 64.

Other piston components 68 each have conventional sealing means to seal the pertinent narrowing 66 in both directions. For the sake of better understanding of the valve of the present invention, this valve will now be discussed in greater detail on the basis of the function of the valve.

When the valve or control piston 16 is displaced in the positive, X, direction, that is, toward the ring disk 42, by the magnetic force of the magnetic system 20, the volume of fluid present inside the damping space 36 is forced from this point in the direction of the appliance connection A, through the throttle 38 in the form of an annular gap 38 between valve housing 10 and ring disk 42. This flow volume displaced through the ring gap generates a local pressure buildup. A damping force on the effective pressure surface of the piston 16 may be detected. A force directed against the displacing force of the valve piston 16 then exerts a damping effect over the entire axis of the valve. On any return of the valve piston 16 in the opposite, negative, X direction, this volume of fluid must now flow back again into the now expanding damping space 36 through the ring gap defined as throttle 38. This flow again exerts an inhibiting effect on the valve piston 16. On the basis of this inhibiting effect produced by the throttle 38, a pressure control valve marked by high stability toward steady-state vibrations is thus developed at low cost by simple and cost-effective production engineering means, since inhibition of valve piston movement is created by the throttle 38 and the damping space 36. Since instability conditions associated with the valve may be counteracted in this way, breakdowns during operation are prevented.

The damping space 36 is a component of a central channel extending along the longitudinal axis of the valve housing 10. The damping space 36 is bounded on one of its sides by one piston component 68 and on the other side by the throttle 38. Both the throttle 38 and the damping space 36 are adjacent to the appliance connection A on the free, frontal, end of the valve housing 10. In addition, the free end of the connecting line 40, which extends parallel to the central channel, discharges into the open at the frontal termination or end of the valve housing 10.

An especially compact structure is thus achieved for the valve, one which performs its function with only one throttle point. In addition, the damping is equalized directly as a result of the effect exerted on the frontal, free, end of the lower piston component 68. The damping space 36 is additionally characterized by the fact that this space, except for the throttle 38, is more or less closed, in particular by way of the sealing device of piston components 68 in the direction of the narrowing 66 toward the pump connection P.

While one embodiment has been chosen to illustrate the invention, it will be understood by those skilled in the art that various changes and modifications can be made therein without departing from the scope of the invention as defined in the appended claims.

What is claimed is:

1. A pressure control valve, comprising:

a valve housing having a pump connection, an appliance connection and a tank connection;

a valve piston movably mounted in said valve housing between a first position connecting said pump connection and said appliance connection in fluid communication and a second position connecting said tank connection with said appliance connection in fluid communication;

a magneto inductor located in said housing and coupled to said valve piston to control movement and positioning thereof; and a hydraulic dampening device mounted in said housing having a dampening space in fluid communication with said appliance connection through a throttle, said throttle including a ring disk with a throttle point impeding fluid flow between said dampening space and said appliance connection and including an annular passage between said ring disk and adjacent parts of said valve housing surrounding said ring disk, said ring disk having hinge connecting points for connection to said valve housing, said annular passage being interrupted by said hinge connecting points and by application of a front of the ring disk to an interior of said valve housing.

2. A pressure control valve according to claim 1 wherein said throttling point has at least one through opening inside said ring disk.

3. A pressure control valve according to claim 1 wherein said annular passage discharges into a connecting channel in said ring disk, said connecting channel being in fluid communication with said dampening space.

4. A pressure control valve according to claim 1 wherein a connecting line extends in said housing parallel to an axis along which said valve piston moves; and said valve piston comprises an annular recess connecting said pump connection and said appliance connection in said first position and connecting said tank connection and said appliance connecting said second position, selectively.

5. A pressure control valve according to claim 1 wherein said tank connection is in fluid communication through a pressure equalization line with a pressure space in said housing, said pressure space receiving an actuating component of said magneto inductor.

6. A pressure control valve according to claim 5 wherein an energy accumulator engages said actuating element and said valve housing, and biases said actuating element against a magnetic force of said magneto inductor.

7. A pressure control valve according to claim 1 wherein said valve housing comprises an external thread for mounting said housing in a valve receptacle; and said valve housing receives part of a proportional magnet for driving said magneto inductor.

* * * * *